INVENTORS.
DOUGLAS F. PARKHILL.
DONALD C. REDPATH.
THADDEUS C. ROSS.
ATTORNEYS.

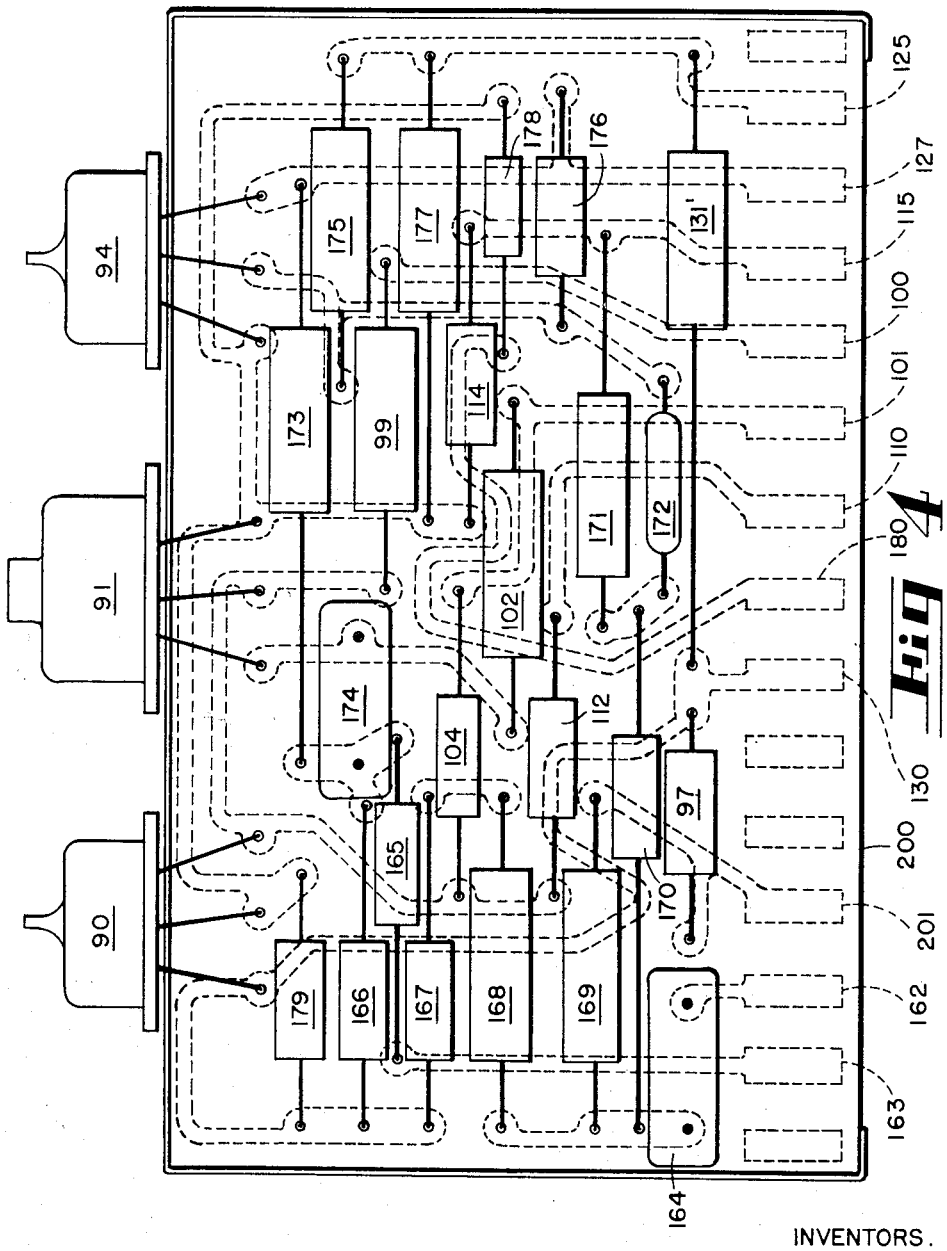
INVENTORS.
DOUGLAS F. PARKHILL.
DONALD C. REDPATH.
THADDEUS C. ROSS.
ATTORNEYS.

March 21, 1961 D. F. PARKHILL ET AL 2,976,428
DIGITAL SYSTEM OF MECHANICALLY AND ELECTRICALLY
COMPATIBLE BUILDING BLOCKS
Filed April 4, 1957 7 Sheets-Sheet 4
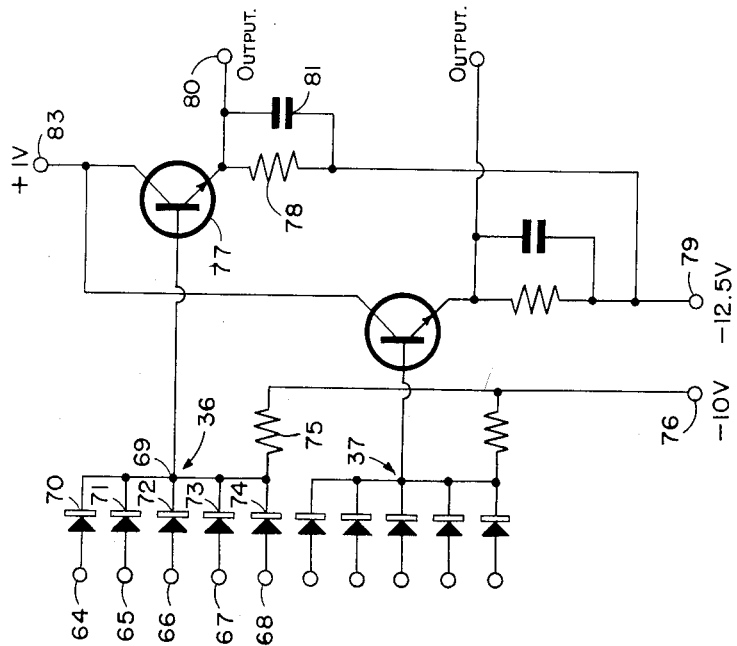
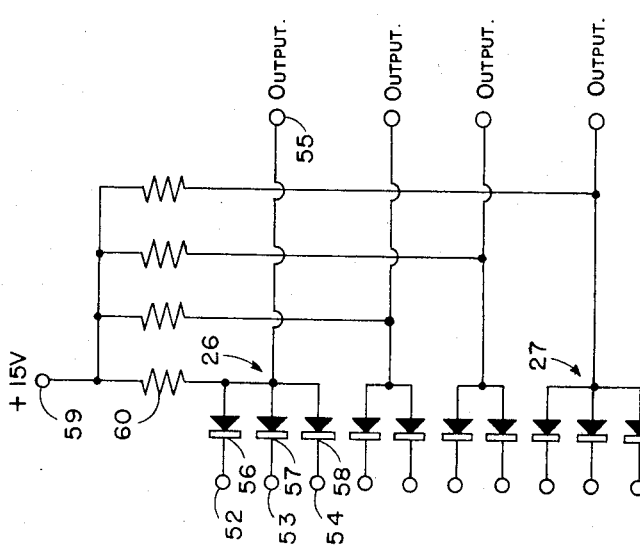
INVENTORS.
DOUGLAS F. PARKHILL.
DONALD C. REDPATH.
THADDEUS C. ROSS.
BY
ATTORNEYS.

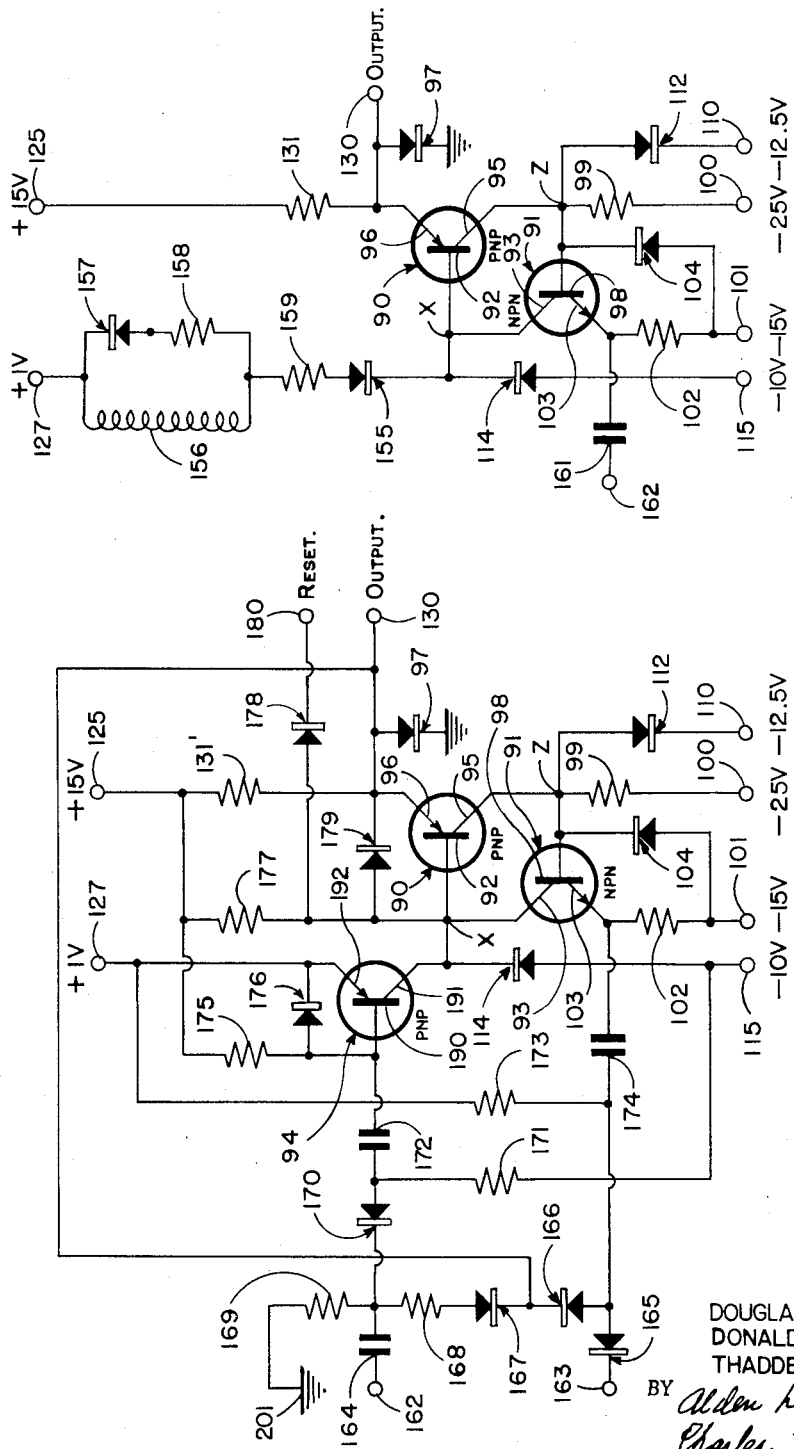

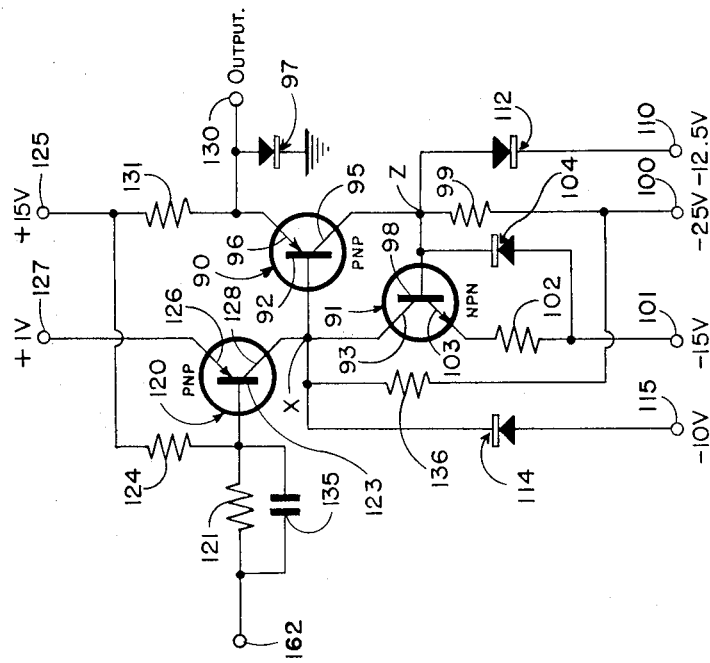
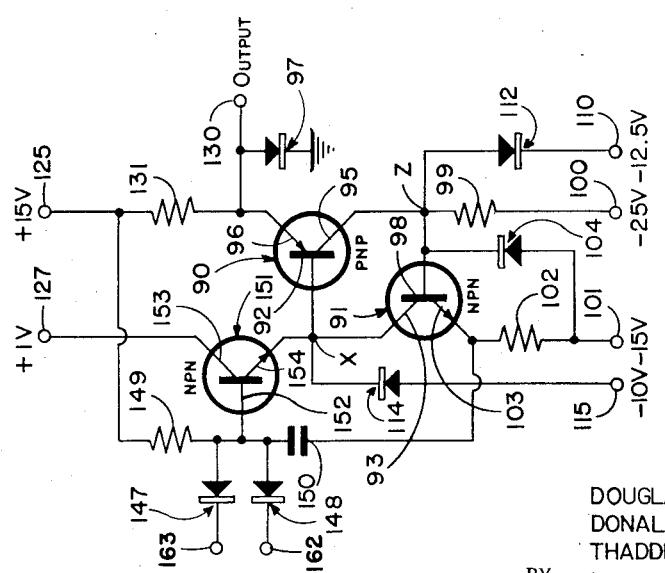
Fig. 7
Fig. 6
INVENTORS.
DOUGLAS F. PARKHILL.
DONALD C. REDPATH.
THADDEUS C. ROSS.

INVENTORS.
DOUGLAS F. PARKHILL.
DONALD C. REDPATH.
THADDEUS C. ROSS.

ATTORNEYS.

United States Patent Office 2,976,428
Patented Mar. 21, 1961

2,976,428

DIGITAL SYSTEM OF MECHANICALLY AND ELECTRICALLY COMPATIBLE BUILDING BLOCKS

Douglas F. Parkhill, Brookline, Donald C. Redpath, Brighton, and Thaddeus C. Ross, Malden, Mass., assignors to Avco Manufacturing Corporation, Cincinnati, Ohio, a corporation of Delaware Filed Apr. 4, 1957, Ser. No. 650,758

1 Claim. (Cl. 307—88.5)

The present invention relates to digital systems and particularly to a system of compatible plug-in units or building blocks which can be used to build up equipment for performing logical decisions in such a range of applications as computers, data-handling systems and automatic control systems.

Subject matter disclosed but not claimed herein is claimed in the co-pending United States patent application of two of the present inventors, Donald C. Redpath and Thaddeus C. Ross, entitled "Transistorized Logical Building Blocks for Digital Systems," filed April 4, 1957, Serial No. 650,773, Patent No. 2,939,967 issued June 7, 1960, and assigned to the same assignee as the present application and invention.

*Objects*

It is a broad object of the invention to provide a system of coordinated and cooperative logical building block units having such mutual capability that, when such units are employed, the construction of digital systems can progress from the functional or block diagram stage to an operating system with a minimum of electronic design and engineering.

A further object of the invention is to provide a system of logical building blocks of miniature size, low power consumption, high speed operation, and temperature stability.

Among the objects of the invention are to provide:

(1) A judicious choice of basic circuit elements constituting the logical operators of the circuit equations expressed in terms of Boolean algebra and symbolic logic;

(2) Compatible circuit units of such a nature as greatly to facilitate the transition from symbolic drawing or equation to physical realization;

(3) Basic building block types performing a sufficient range of functions to produce all of the generally known logical systems without excessive multiplication of units;

(4) Basic units characterized by a maximum of compatibility with each other;

(5) Basic units having outputs characterized by a uniform clamped pulse amplitude and impedance level;

(6) Basic units having output pulse amplitudes sufficient to assure reliable operation in the presence of the stray noise pick-up which is found in large digital systems; and (7) Logical building blocks having sufficiently fast operating speeds as to fully exploit fast access matrix memory systems.

The system of the invention utilizes the novel elements herein disclosed, to wit: the bistable trigger element, the monostable element, the inverter element, and the gated amplifier.

Alos herein disclosed are "And" and "Or" gate units suitable for conjoint use with the foregoing novel units.

Further objects of the invention are to provide:

(1) An arrangement of active unit (i.e., units of Figs. 3, 5, 6 and 7) terminals in a uniform position and sequence which facilitates compatibiltiy;

(2) A digital system of logical building blocks in which the units are proportioned to operate with pulse input and output signals within uniform levels, a feature which facilitates electrical compatibility.

*Drawings*

For a better understanding of the present invention, together with other and further objects, advantages, and capabilities thereof, reference is made to the following description of the accompanying drawings, in which:

Fig. 1 is an illustrative block diagram form showing typical Boolean algebraic or logical equations suitable for solution by a system of logical building blocks in accordance with the invention and the corresponding functional or switching circuits required for such solution;

Fig. 2, again in diagrammatic block form, is a suitable arrangement of transistorized logical building blocks employed in a system in accordance with the invention, directed to the solution of the illustrative equations represented in Fig. 1;

Fig. 3 is a circuit diagram of the novel transistorized bistable trigger element or building block used in the practice of the invention;

Fig. 4 is a top plan view of the preferred form of bistable trigger element used in the practice of the invention, showing the printed circuitry, the transistors and terminals, and illustrating in block form (and therefore not with graphic fidelity) the various resistance and capacitance and diode elements of the bistable trigger unit;

Fig. 5 is a circuit diagram of the novel transistorized monostable element or building block used in the practice of the invention;

Fig. 6 is a circuit diagram of the novel transistorized gated amplifier or building block used in the practice of the invention;

Fig. 7 is a circuit diagram of the novel transistorized inverter amplifier or building block used in the practice of the invention;

Fig. 8 is a circuit diagram of a preferred form of multiple "And" gate package or unit suitable for incorporation in a system utilizing the invention;

Fig. 9 is a circuit diagram of a preferred form of multible "Inclusive or" gate package or unit suitable for incorporation in a system utilizing the invention;

*An illustrative system*

The invention provides an improved digital system. The following hypothetical problem is assumed for purposes of illustrating one of many applications of the invention.

Figure 1:
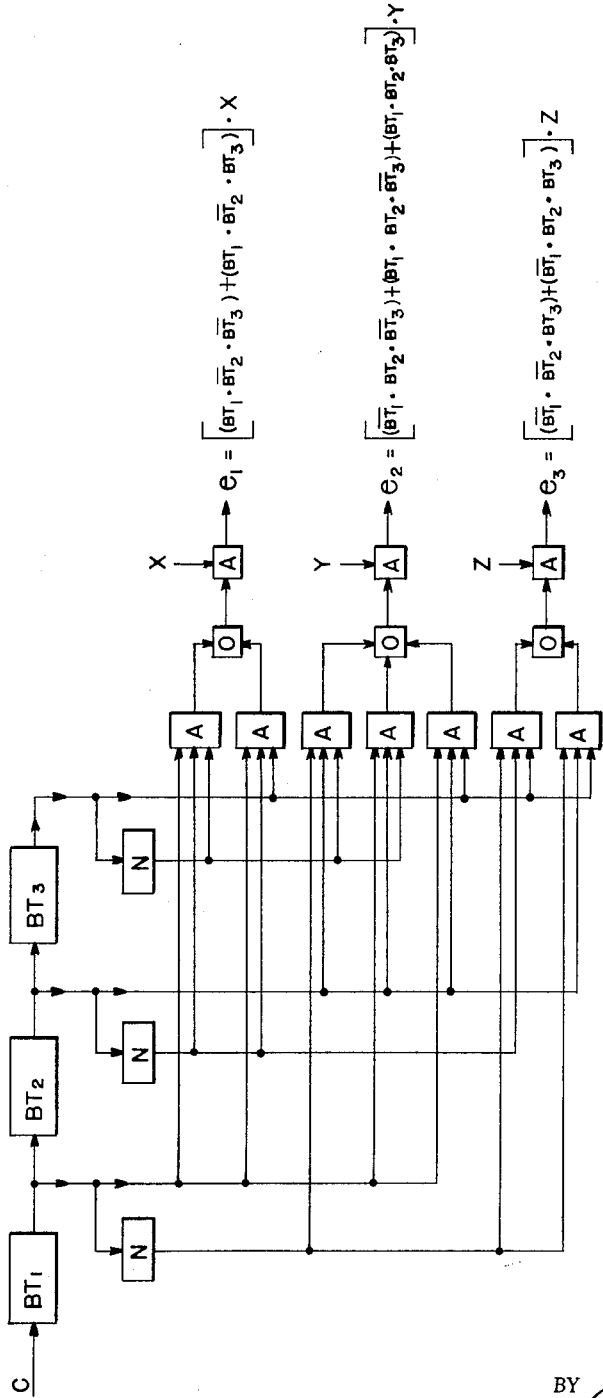

Let us assume a desire to provide a circuit into which four input signals, symbolized as C, X, Y, and Z, flow, and from which three output signals $e_1$ $e_2$, $e_3$ are obtained (Fig. 1). The specifications here assumed called for output signals having these characteristics:

$e_1$ is to coincide with the first and the fifth input pulses on the C line, provided that X also is present on its line at these times;

$e_2$ is to coincide with the second, third, and seventh input pulses on the C line, provided that Y also is present on its line at these times;

$e_3$ is to coincide with the fourth and sixth input pulses provided that a signal Z also is present on its line at these times.

The problem postulates the desirability of delivering the output signals at low impedance.

Translating these requirements into appropriate Boolean equations, they are as follows:

$$e_1 = (C_1 + C_5) \cdot X \quad (1)*$$
$$e_2 = (C_2 + C_3 + C_7) \cdot Y \quad (2)$$
$$e_3 = (C_4 + C_6) \quad (3)$$

* Employing the plus symbol, having the meaning of "or" as discussed in "Arithmetic Operations in Digital Computers," Richards, pages 26 et seq., Van Nostrand, New York, 1955.

Expressing the desired count in an arbitrarily suggested binary system, the binary equivalents of the desired counts are:

| | | | | |
|---|---|---|---|---|
| 0 | 0 0 0 | | 4 | 0 0 1 |
| 1 | 1 0 0 | | 5 | 1 0 1 |
| 2 | 0 1 0 | | 6 | 0 1 1 |
| 3 | 1 1 0 | | 7 | 1 1 1 |

The required counter is a three-stage arrangement (a chain of scale-of-two counters) which can be built from three bistable trigger elements (Fig. 1) whose states on successive counts can be expressed as follows:

$$C_1 = BT_1 \cdot \overline{BT_2} \cdot \overline{BT_3} \quad (4)$$
$$C_2 = \overline{BT_1} \cdot BT_2 \cdot \overline{BT_3} \quad (5)$$
$$C_3 = BT_1 \cdot BT_2 \cdot \overline{BT_3} \quad (6)$$
$$C_4 = \overline{BT_1} \cdot \overline{BT_2} \cdot BT_3 \quad (7)$$
$$C_5 = BT_1 \cdot \overline{BT_2} \cdot BT_3 \quad (8)$$
$$C_6 = \overline{BT_1} \cdot BT_2 \cdot BT_3 \quad (9)$$
$$C_7 = BT_1 \cdot BT_2 \cdot BT_3 \quad (10)$$

In the foregoing expressions $C_1$, $C_2$, etc., designate input pulses on the C line, and $BT_1$, $BT_2$, and $BT_3$ designate the three bistable trigger units of the binary counting chain which function as the counter. The line over such expressions as $\overline{BT_2}$ indicates that a particular unit is in its binary zero or conductive state.

Now, substituting in Equations 1, 2, and 3 the values of $C_1$ through $C_7$ indicated in Equations 4 through 10, the Boolean equations for the required circuits can now be written:

$$e_1 = [(BT_1 \cdot \overline{BT_2} \cdot \overline{BT_3}) + (BT_1 \cdot \overline{BT_2} \cdot BT_3)] \cdot X \quad (11)$$
$$e_2 = [(\overline{BT_1} \cdot BT_2 \cdot \overline{BT_3}) + (BT_1 \cdot BT_2 \cdot \overline{BT_3}) + (BT_1 \cdot BT_2 \cdot BT_3)] \cdot Y \quad (12)$$
$$e_3 = [(\overline{BT_1} \cdot \overline{BT_2} \cdot BT_3) + (\overline{BT_1} \cdot BT_2 \cdot BT_3)] \cdot Z \quad (13)$$

Figure 2:
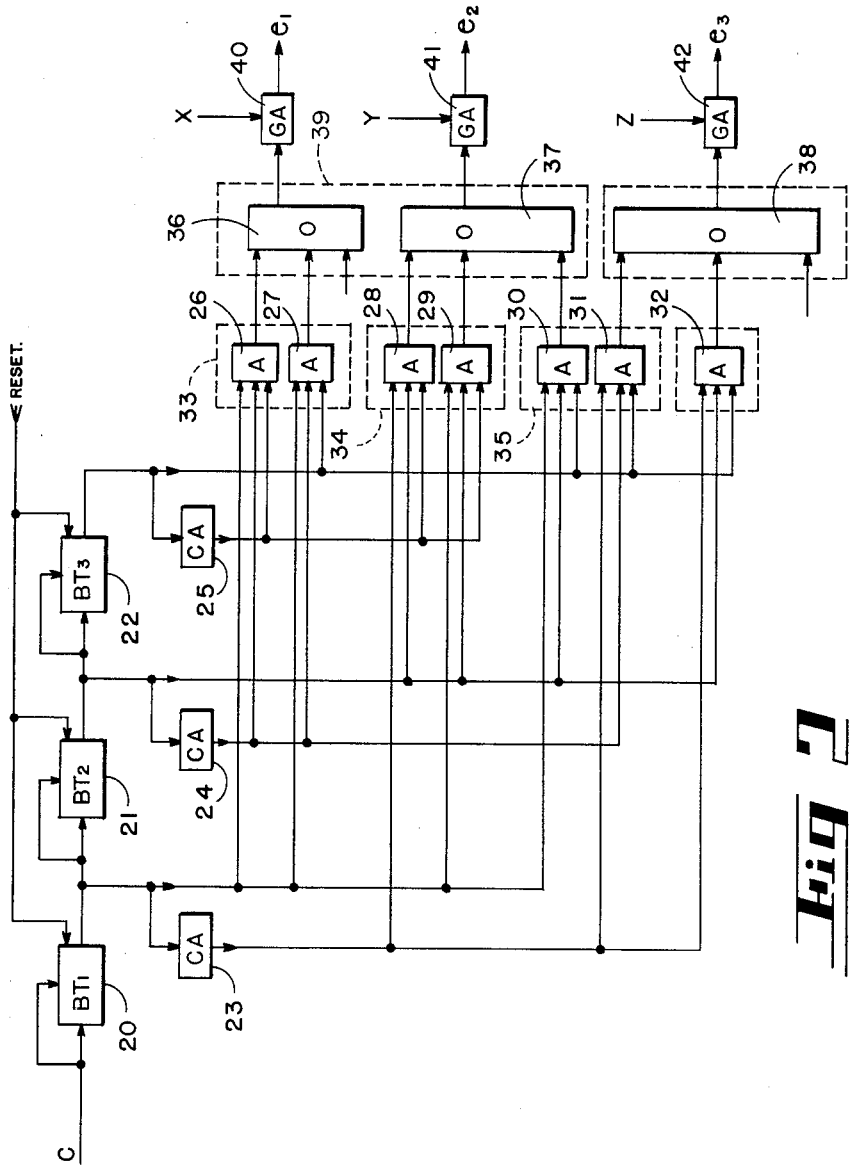

The logical block diagram for these equations is shown in Fig. 1, and their physical realization is illustrated in Fig. 2.

In the physical embodiment of a system utilizing the invention, as shown in Fig. 2, it is preferred to use gated amplifier elements (per Fig. 6) incorporating a coincidence gate in lieu of the simple "And" circuits indicated at the three outputs $e_1$, $e_2$ and $e_3$ because of the desirability of low impedance outputs as dictated by the hypothetical requirements stated above.

In Fig. 1 the letter C indicates a source of clock pulses, and the letter designations $BT_1$, $BT_2$, and $BT_3$ are indicative of bistable trigger units. The letter N designates a "Not" or complementer amplifier element. The letter A is representative of an "And" circuit (per Fig. 8) and the letter O is indicative of inclusive "Or" circuits (per Fig. 9). Input signals X, Y, and Z are applied to the lines indicated. The outputs $e_1$, $e_2$, and $e_3$ satisfy the Boolean equations set forth in Fig. 1 and discussed above.

Referring now specifically to Fig. 2 of the drawings, it will be seen that the required system is built up from a relatively few basic units provided in accordance with the invention. There are illustrated bistable trigger units or building blocks 20, 21, and 22; complementer amplifiers or "Not" circuits 23, 24, and 25; "And" gate circuits 26, 27, 28, 29, 30, 31, and 32, the first six of which are paired in multiple "And" gate packages 33, 34, and 35; "Or" gate circuits 36, 37, and 38, the first two of which are paired in a multiple "Or" gate package; and gated amplifiers 40, 41, and 42, each having a coincidence gate for performing a logical "And" operation.

Thus it will be seen that in Fig. 2 the system is realized by the use of five basic types of logical building blocks or units. When the Boolean equations and block diagram are set up, the association of the units is immediately indicated, so that the digital system designer, logician, or computer engineer has the same freedom and flexibility in setting up various systems as does the electrical engineer in the use of resistor, inductor and capacitance units. The five basic units illustrated in Fig. 2 are briefly described as follows:

The bistable trigger element, such as 20, which combines a bistable element with suitable triggering and gating to function as a scale-of-two circuit or flip-flop or memory element;

The complementer amplifier element or "Not" circuit, such as 23, which provides an output which is the "ones" complement of the input (i.e., changes ones to zeros and zeros to ones);

The "And" gate package, such as 33, containing a number of multiple input crystal diode coincidence gates with input and output impedance levels suitable for use with the other logical building blocks;

The multiple "Or" gate package, such as 39, a generally similar unit to perform the logical "Or" operation; and The gated amplifier building block, such as 40, a pulse amplifier incorporating a coincidence gate for the performance of the logical "And" operation.

Additionally, the system of the invention employs a monostable unit illustrated in Fig. 5, suitable to be driven by any one of the outputs $e_1$, $e_2$, and $e_3$, and having voltage and impedance levels suited to such purpose.

In Figs. 1 and 2 reference is made to bistable trigger elements designated $BT_1$, etc. The improved element is shown in detail in Figs. 3, 4, 10 and 11. This is the element which remains in one of two stable output levels and changes states by reason of the application of suitable input trigger pulses. With the illustrative parameters herein furnished, the bistable unit provides clamped output levels of 0 volt or —10 volts. External D.C. loads of up to 30 milliamperes may be drawn from the unit. The total switching time is under 0.2 microsecond, with the rise and decay times being generally 0.15 microsecond or less.

The unit will trigger on pulses with pulse repetition frequencies up to one megacycle when used as a scale-of-two circuit.

The total power consumption of the element in the "off" or 0 voltage state is 100 milliwatts, and in the "on" or —10 volt state approximately 350 milliwatts.

The element is capable of reliable operation over a temperature range of —50° to +85° C.

The size of this element and all companion units is 2½" x 2¼" x ½".

In Figs. 1 and 2 reference is made to the "And" and "Or" gate units, respectively designated by the letters "A" and "O." Such units are shown in detail in Figs. 8 and 9, respectively. In Fig. 1 reference is made to a "Not" circuit, and in Fig. 2 corresponding reference is made to an inverter or complementer amplifier "CA." The details of a complementer amplifier in accordance with the invention are shown in Fig. 7. This unit provides an output which is the complement of the input. In Fig. 1 the final output "And" units are designated "A," and in Fig. 2 the corresponding units are designated "GA." Gated amplifiers are employed in order to deliver output signals at low impedance, and such a gated amplifier in accordance with the invention is shown in detail in Fig. 6. This unit provides power amplification.

There is also provided a monostable unit, the details of which are shown in Fig. 5. It will be understood that any of the outputs of Fig. 2 may be employed to drive a monostable unit. These units or building blocks constitute the basic elements of the system or of any one of a large number of systems. These logical building blocks have the following advantages, adding up to surprising results:

(1) They utilize a very small number of types of components;

(2) They can be applied with great flexibility, wherever the appropriate logical operation is required;

(3) The units are compatible with each other, and they require only a few uniform supply voltages, a characteristic which becomes manifest from an observation of the typical voltage values herein given for the several units;

(4) There is a considerable community of circuitry among the several active units of the system (as distinguished from the passive "And" and "Or" gate packages), the latter package being here arbitrarily treated as passive even though it contains transistors.

For very high frequency operation (1 megacycle per second) of the counter chain (Fig. 2), the third unit $BT_3$ should be triggered by the output of an additional "And" gate (not shown in drawings), because the ratio of carry time to clock period is too high for completely reliable triggering. This "And" gate has an output connected to the input of $BT_3$ and three inputs separately connected to the C line, the output of $BT_1$ and the output of $BT_2$. The third unit receives an input pulse from the output unit of this "And" gate when these conditions are satisfied:

First, a pulse is applied on line C; and

Second, both of the first two units are at "0" state. In such case the output of $BT_2$ is applied only to such "And" gate and such "And" gate output is also applied to complementer amplifier 24 (Fig. 2).

The "And" gate

A multiple "And" gate package, suitable for use in a system embodying the invention and incorporating diode circuits, is illustrated in Fig. 8. This package contains four gates, including two triple input gates 26 and 27. Gate 26 is described in detail as representative. This "And" circuit comprises three input terminals 52, 53, and 54, each individually coupled to an output 55 through the appropriate one of diodes 56, 57, and 58, the diodes being poled with their cathodes in proximity to the input terminals. Positive anode voltage is applied to each of the diodes, from a supply terminal 59, through common resistor 60.

The operation of the Fig. 8 gate 26 is such that if any one (or more, or all) of the input terminals drops to a representative potential of, say, −10 volts relative to ground, the output terminal 55 is clamped to such −10 volt potential by reason of the conductivity of the diode connected to such input terminal. In other words, the output terminal 55 is, by the operation of this circuit, clamped on to the most negative input terminal.

In discussing the operation of Fig. 8 gate 26, let it be assumed for purposes of illustration that an input level of −10 volts is indicative of binary 0 and an input level of 0 volts is indicative of binary 1. When all of the input terminals 52, 53, and 54 are held at −10 volts potential, the output terminal 55 will also be at that potential, because the voltage drop from the positive supply terminal 59 appears across the common load resistor 60 and not the diodes. The same is true if any one of the input terminals 52, 53, and 54 is at −10 volts potential, because in this building block the output terminal 55 clamps on to the most negative input terminal. Only when 1's appear on all three input terminals 52, 53, and 54 (i.e., input pulses assumed to be of square-topped character and extending from −10 volts to 0 volt) will potential on the output terminal 55 become zero volt, as is required for a 1 indication under the specification of values assumed. In other words, the output terminal 55 will reach the 0 voltage level, for a 1 indication, only when the "And" condition is satisfied (i.e., only when square-topped pulses peaking at 0 volts are applied to all of the three input terminals).

Note is made of the fact that it is not necessary to clamp the inputs to the gates 26, etc., because the driving building blocks for such gates are appropriately clamped, as described hereinbelow. Compatibility of this building block with the other building blocks is further assured by using a supply potential of +15 volts, a representative figure commonly employed in these building blocks. Aside from such considerations, making for compatibility, the circuit connections and operation of the diode "And" gate just described are generally conventional, as shown in "Arithmetic Operations in Digital Computers," R. K. Richards, pages 32 and 33, Van Nostrand, New York, 1955; "Pulse and Digital Circuits," Millman and Taub, page 398, McGraw-Hill Book Co., New York, 1956; and "Principles of Transistor Circuits," Richard F. Shea, page 425, John Wiley and Sons, New York, 1953, for example.

The following representative parameters have been found to be suitable in one successful digital system utilizing the invention:

Diodes 56, 57 and 58 _____ Type 1N90.
Load resistor 60 _____ 4700 ohms, .033 watt.
Voltage at terminal 59 _____ +15 volts.
Input pulses, square-topped ____ From −10 to 0 volts.

It will be understood that the remaining diodes and load resistors and terminals of the multiple "And" gate package of Fig. 8 are similar, the gate 27 being a three-input gate identical to gate 26, and the remaining double-input gates being self-explanatory, all load resistors being connected to the common positive supply terminal 59.

The "And" gate circuit as just described is designated by the letter "A" in Figs. 1 and 2, which illustrate a system application in which "And" circuits are usefully employed.

The "Or" gate

Referring now to Fig. 9, there is shown a multiple "Or" gate package for utility in a system incorporating the invention. This logical building block consists of two five-input "Or" gates, of which only that designated 36 is described in detail, the gates 36 and 37 being identical. The word "Or" as applied to these gates is to be understood as designating the inclusive use of the word. This "Or" circuit comprises five input terminals 64, 65, 66, 67, and 68, each individually coupled to a point 69 through the appropriate one of diodes 70, 71, 72, 73, and 74, the diodes being poled with their anodes in proximity to the input terminals and with cathodes in proximity to the output terminals and with their cathodes connected to a common load resistor 75, the remaining lead of which is connected to the negative terminal 76 of a source of supply voltage (at −10 volts, for example). When all input terminals indicate 0 (i.e., are at −10 volts), the point 69 will also indicate 0 (−10 volts), because the diodes are non-conducting and their resistance to current flow is high. If any one of the input terminals 64–68 is raised in potential to indicate a 1 (as by application of a square-topped pulse going from −10 volts to 0 volts), point 69 will indicate a 1 condition (0 volt) because an increased amount of current will be caused to flow in the load resistor 75. In other words, point 69 will be connected through a relatively low impedance to any input line with a 1 signal, and the diodes corresponding to the input line with a 0 signal will not pass current because the potentials on their terminals will be in the high impedance direction. Therefore a positive going output pulse (i.e., one going from −10 to 0 volts) will appear at point 69 if any one or more of the input terminals 64 through 68 has applied thereto a pulse of the character indicated. This circuit behavior is as generally indicated in the publications cited above: Shea, page 424; Millman and Taub, page 394; and Richards, page 32, for example.

In the "Or" gate circuit according to the invention the negative going edge of the over-all output pulse is employed to trigger active elements, so that the "Or" package includes a transistor stage of amplification. To this end, there is provided an emitter follower amplifier comprising a transistor 77, the base of which is connected to the gate terminal 69. This amplifier is arranged as an emitter follower so as to provide current gain, a high impedance input and a low impedance output. For the NPN transistor shown, the emitter is biased negatively or in a forward direction relative to the base by connection, through resistor 78, to the negative terminal 79 (−12.5 volts) of a voltage supply source. It will be seen that the emitter is at all times negative relative to the base, but the emitter-base junction becomes more conductive upon application of the pulse of the type described and produces a pulse of similar shape at its output. That is, when a pulse of such type is applied to any one of the input terminals 64–68, conductivity of the emitter-base junction is increased and the emitter circuit follows the signal applied to the base, so that there appears at output terminal 80 a positive going pulse, generally square-shaped, rising from −10 volts to 0 volt. The output terminal 80 is, of course, connected to the emitter of transistor 77. For the purpose of hole-storage clean-up, there is connected in series with the emitter the parallel combination of a resistor 78 and a capacitor 81. During pulse generation the capacitor 81 charges through the source and in effect puts a reverse bias on the base-emitter junction for the purpose of overcoming the hole-storage effect, thereby sharpening up and rendering more linear and steep the trailing edge of the output pulse and increasing its effectiveness for driving other elements.

When all inputs go down to −10 volts, the current through the transistor 77 is reduced. Because of undesired hole storage effects the output voltage, in the absence of the capacitor 81, would not follow the input voltage down as rapidly as is desired, and the turn-off time of the transistor would be unduly prolonged. The capacitor 81 provides a reverse bias across the emitter-base junction of transistor 77, tending to turn it off.

The capacitor 81 acquires its charge when the output terminal 80 goes to the binary 1 condition at 0 volts potential.

The time constant of the circuit including resistor 78 and capacitor 81 is on the order of and comparable to the fall time of the input pulses applied to the input terminals.

For the purpose of further preventing undesired hole-storage effects and to prevent the transistor from saturating, the collector is connected to a fixed source of reverse bias at terminal 83 (+1 volt). It will be understood that the values herein mentioned are provided by way of illustration and not limitation. This combination of "Or" gate emitter-follower amplifier and wave-shaping network delivers a well-formed pulse at low impedance.

From the foregoing description the construction and operation of gate 37 and the associated transistor amplifier will be apparent.

In one successful embodiment of the invention, the following parameters for the Fig. 9 "Or" gate circuit were found to be satisfactory:

| | |
|---|---|
| Diodes 70, 71, 72, 73 and 74 | Type 1N90. |
| Resistor 75 | 4700 ohms. |
| Resistor 78 | 680 ohms. |
| Voltage at terminal 76 | −10 volts. |
| Voltage at terminal 83 | +1 volt. |
| Voltage at terminal 79 | −12.5 volts. |
| Capacitor 81 | 270 micromicrofarads. |
| Transistor 77 | Sylvania type 2N94A. |
| Input pulses, square-topped | From −10 to 0 volts. |

The "Or" gate circuit just described is designated by the letter "O" in Figs. 1 and 2, which illustrate a system application in which "Or" circuits are usefully employed.

Only the two inputs 64 and 65 of gate 36 (Fig. 9) are used in the Fig. 2 application, wherein three of the inputs of gate 37 are employed.

The bistable trigger element

Referring again to Figs. 1 and 2, reference is made to the bistable trigger units indicated by the letter designations $BT_1$, $BT_2$ and $BT_3$. The action of each bistable trigger unit is such that it alternates between its two stable states upon the application of each successive input pulse. In this regard an analogy has been drawn between bistable electronic circuits and a pull-chain light switch, which reverses its state ("on" or "off") each time the chain is pulled. (See "High Speed Computing Devices," Engineering Research Associates, Inc., page 15, McGraw-Hill, New York, 1950.) Such bistable devices generally are classified as scale-of-two counters, i.e. modulo 2 or binary counters. The radix 2 counter illustrated in Figs. 1 and 2 comprises a chain of cascaded scale-of-two counters designated $BT_1$, $BT_2$, and $BT_3$. $BT_1$ receives the pulses to be counted, and each pulse on line C causes $BT_1$ to reverse its state. The output from $BT_1$ drives $BT_2$. In similar fashion the output from $BT_2$ drives $BT_3$. It is clear that each time unit $BT_1$ or $BT_2$ changes from a binary 1 to a 0 condition, a pulse, of such a nature as to change the state of the next counter in cascade, will be introduced to the input of such counter, so that a carry is produced.

A typical bistable trigger unit in accordance with the invention is illustrated in Figs. 3, 4, 10 and 11. It performs the function designated by the circuit $BT_1$, for example, in Figs. 1 and 2 and does so in an improved manner and with an improved electrical circuit and mechanical construction.

Figure 12:
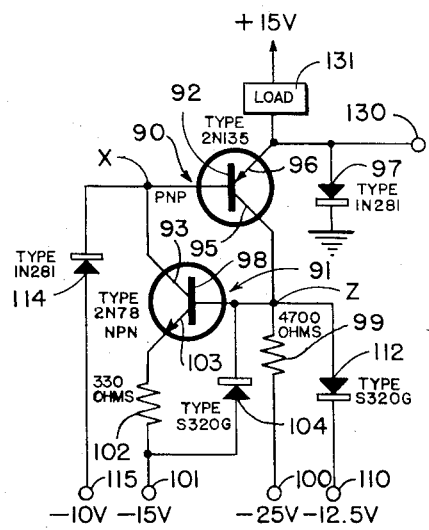
Fig. 12 is a circuit diagram of the PNPN circuitry which is common to the active units, i.e., the units of Figs. 3, 5, 6 and 7.

The bistable trigger unit represents an improvement in PNPN transistor circuitry and novel combinations utilizing such circuitry as a part. In its generic electrical aspects this unit has much in common with the other active building blocks provided in accordance with the invention. Reference is made to Fig. 12 in discussing those aspects.

A pair of junction transistors 90 and 91, one of PNP type and the other of NPN type, are provided. The base 92 of PNP transistor 90 is connected to the collector 93 of NPN transistor 91. Similarly, the base 98 of transistor 91 is connected to the collector 95 of transistor 90. As shown in U.S. Patent 2,655,609 to Shockley and in the work of Norman Moody of the Canadian Research Board, this combination constitutes an equivalent transistor having a current multiplication factor far greater than either of the transistors. For voltages impressed at point X above a certain value, the combination and the individual transistors are in a cut-off condition. When voltages below a certain value are applied, the combination rapidly goes into a high current or conductive state. This is referred to as the PNPN structure. This structure has two stable output levels and is capable of changing states by reason of the application of suitable trigger pulses.

The voltages and other values and parameters herein disclosed are intended to be illustrative and are not furnished by way of limitation, except as certain claims may specifically otherwise indicate.

The two output levels of the PNPN structure (Fig. 12) are represented by a binary "1" (non-conductive or "off" state, 0 volts output) and a binary "0" (conductive or "on" state, −10 volts output). The element changes its output level from a binary 1 to a 0 state upon the application to the emitter of transistor 91 of a negative-going square-topped pulse, descending from 0 volts to −10 volts. A similar negative pulse applied, as in Fig. 3, to the base of common emitter transistor 94 (which causes point X to be raised slightly above 0 volts) resets the unit in its non-conducting binary 1 state.

The PNPN structure per se is not adequate for digital system purposes because it is characterized by a normal collector current of such magnitude as to fire the structure. In Fig. 12 there is shown an improvement in which such structure is, in a relatively simple manner, stabilized in both states, utilized to provide properly clamped predetermined output voltages, advantageously exploited in combination with other transistor circuits, and appropriately biased to prevent saturation and undesired bottoming effects.

A negative clamping diode 97 is connected between the emitter 96 and ground, to assure that the output voltage cannot go more positive than 0 volts when the PNPN structure is in its off or binary 1 state. It will be understood that a suitable load resistor 131 is connected between terminal X and the source of positive biasing potential (15 volts) for emitter 96. The output level is accordingly clamped at ground potential for the PNPN structure cut-off condition. In order to provide negative bias for the transistor 91 (i.e., reverse emitter-base bias), to hold that transistor in its non-conducting state, the base 98 is connected, through resistor 99, to a terminal 100 which is more negative in potential (−25 volts) than the terminal 101 (−15 volts) to which, through resistor 102, emitter 103 is connected. A diode 104 is connected between base 98 and terminal 101, and poled with its cathode adjacent base 98, so that current flow through the diode in the circuit 101, 104, 99, 100 produces a small bias to hold transistor 91 cut off, the voltage drop across the diode biasing the emitter 103 positive (in a reverse direction) relative to the base.

In order to provide positive cut-off bias for the transistor 90 (i.e., reverse emitter-base bias), the base 92 is coupled to a positive voltage supply at a point (not shown in Fig. 12) which is more positive than the emitter 96, i.e., slightly more positive than the emitter 96, during cut-off of the structure. (In the monostable unit, for example, Fig. 5, this point 127 is at +1 volt.) When the PNPN structure is conducting, point X is at −10 volts and point Z is close to −12.5 volts. When the PNPN structure is off point X is slightly above 0 volts and point Z is between −15 volts and −16 volts.

"Bottoming" or saturation of collector currents in each transistor (90 and 91) is prevented by providing a reverse bias across each collector-to-base junction. This is accomplished by a circuit comprising terminal 110 (at −12.5 volts), a negative clamping diode 112 (the anode of which is connected to the base 98 and collector 95), the two base-collector junctions, positive clamping diode 114 (the cathode of which is connected to the base 92 and collector 93), and terminal 115 (at −10 volts). Tracing this circuit from 115 and 110 and bearing in mind that terminal 110 is 2.5 volts negative relative to terminal 115, this circuit produces a small reverse bias across each base-collector junction, to prevent saturation.

For the conductive condition of the PNPN structure, point X (that is, the junction of collector 93 and base 92) is clamped at −10 volts by positive clamping diode 114. This diode also functions to clamp the output terminal 130 at −10 volts for the conductive condition of the PNPN structure, because under that circumstance the emitter-base junction 92, 96 is conducting. That is, the output voltage at terminal 130 cannot go more negative than −10 volts when the structure is conducting.

The generic Fig. 12 combination is therefore employed in the bistable trigger unit, the complementer, the gated amplifier and the monostable unit, with the result that all the active units, taken together, use much standardized circuitry, and a relatively few types of components.

The generic aspects (Fig. 12) of the bistable trigger element (Figs. 3, 4, 10, and 11), the monostable element (Fig. 5), the gated amplifier (Fig. 6), and the complementer amplifier (Fig. 7) have been noted. Referring now specifically to Fig. 3, the bistable trigger element there shown has two stable output levels, 0 volts (representing the binary 1), and −10 volts (representing the binary 0). The element has two inputs 162 and 163. A negative-going edge or pulse at the binary 1 input 162 sets the element to the 1 or "off" condition, if the element is not already in that condition. Similarly, a pulse on the binary 0 input 163 sets the element to the 0 or "on" condition, if the element was previously in the 1 condition. The two inputs 162 and 163 are joined externally to provide a scale-of-two circuit, in which case pulses at the single common input 162–163 will alternately cause the stage to assume its two stable states.

This bistable trigger element may be employed in many computer and control applications, such as counters, memory elements, and control of logical gates. Its high output current and low impedance render it effective in driving large numbers of diode gates at high speed.

The Fig. 3 bistable trigger unit comprises a common emitter stage in a novel combination with a PNPN structure and novel clamping, biasing and stabilizing circuits. The common emitter PNP transistor 94 is so arranged that it is non-conducting at all times except when an "off" input pulse is applied to base 190 through capacitor 172. Base 190 is connected, through resistor 175, to voltage supply terminal 125 (plus 15 volts) and emitter 192 is connected to terminal 127 (plus 1 volt). Point X (collector 93 and base 92 of the PNPN structure) is clamped to minus 10 volts, during an "on" condition of the PNPN structure, by the positive clamping diode 114, the cathode of which is connected to point X and the anode of which is connected to terminal 115 (minus 10 volts). The base-emitter junction 190, 192 is non-conducting when the voltage at collector 191 has been raised to 0 volts. That is, the transistor 94 is rendered conductive for the purpose of turning the PNPN structure off. When such structure ceases to conduct, the transistor 94 has performed its function and it also ceases to conduct. A negative pulse of −10 volts amplitude, as applied to terminal 162, will therefore turn on transistor 94 for a short period and will cause the PNPN structure to be turned off.

A diode 176 is connected across the base emitter junction of transistor 94 with its anode connected to base 190 so that current through the circuit comprising terminal 125, resistor 175, diode 176, and terminal 127 holds the base of transistor 94 biased in a more positive direction than the emitter 192 (i.e., in a reverse direction) at all times except when an "off pulse" is applied to such base through capacitor 172.

When transistor 94 conducts, point X is raised upwardly in potential above 0 volts and close to 1 volt, thereby turning the PNPN structure off, as has previously been explained. During the off condition of the PNPN structure point X remains slightly above 0 volts, being clamped by diodes 179 and 97, so that the PNPN structure remains in the off condition. Upon the termination of the "off" pulse supplied through capacitor 172 the base of transistor 94 rises in potential and that transistor ceases to conduct. For the reasons stated terminal 162 is shown as the input for the binary 1 or "off" condition of the PNPN structure.

A negative clamping diode 97 is connected between the emitter 96 and ground, with its cathode on the ground side, to clamp the output voltage peak to ground level (0 volts) when the output terminal 130 is in the binary 1 state.

Load resistor 131' (so designated because its preferred value in the bistable unit is different from the value of resistor 131 in the other active units) is connected between emitter 96 and terminal 125 of a voltage source (+15 volts) to supply positive biasing potential for emitter 96. In order to provide negative bias for the base of transistor 91 (i.e. reverse emitter-base bias), to hold that transistor in its non-conducting state, the base 98 is connected, through resistor 99, to a terminal 100 which is more negative in potential (−25 volts) than the terminal 101 (−15 volts), to which, through resistor 102, emitter 103 is connected.

A diode 104 is connected between base 98 and terminal 101, and poled with its cathode adjacent base 98, so that current flow through the diode in the circuit 101, 104, 99, 100 produces a small bias to hold transistor 91 cut off, the voltage drop across the diode biasing the emitter 103 positive (in a reverse direction) relative to the base.

Saturation of collector currents in each transistor is prevented by providing a fixed reverse-bias across each collector-to-base junction. This is accomplished by a circuit comprising terminal 110 (connected to a supply voltage, at −12.5 volts), a negative clamping diode 112 (the anode of which is connected at point Z to the base 98 and collector 95), the two base-collector junctions, positive clamping diode 114 (the cathode of which is connected to the base 92 and collector 93), and terminal 115 (at −10 volts). Tracing this circuit from 115 to 110 and bearing in mind that terminal 110 is 2.5 volts negative relative to terminal 115, this circuit produces a small reverse bias across each base-collector junction, to prevent saturation.

That is to say, positive clamping circuit 114 clamps the base of the wave form at point X to −10 volts when the PNPN structure is conducting. Negative clamping circuit 112 clamps the peak of the voltage wave form at point Z to −12.5 volts when the PNPN structure is conducting.

In accordance with the invention there are provided several circuits for holding transistors in non-conductive states, as desired. For example, we have seen that the voltage drop across diode 104, caused by electron flow in the circuit 100, 99, 104, and 101, holds transistor 91 non-conductive. Similarly, diode 179 is connected across the base-emitter junction of transistor 90, with the cathode of the diode connected to the emitter 96. The anode of the diode is connected, through resistor 177, to terminal 125 (+15 volts). Since this emitter is clamped to 0 volts (ground) when the PNPN structure is off, there is a voltage drop across diode 179 holding transistor 90 non-conductive. That is, electron flow in the circuit ground, 97, 179, 177, 125 is in such a direction as to bias base 92 positively (in a reverse direction) relative to emitter 96.

Similarly, diode 176 is connected across the base-emitter junction of transistor 94, with the cathode of the diode connected to the emitter 192. The anode of the diode is connected, through resistor 175, to terminal 125 (+15 volts), and the cathode is connected to terminal 127 (+1 volt). There is therefore a voltage drop across diode 176, holding transistor 94 non-conductive. That is, electron flow in the circuit 127, 176, 175, 125 is in such a direction as to bias base 190 positively (in a reverse direction) relative to emitter 192.

As to the operation of the bistable trigger unit, let an "off" condition of the PNPN structure be assumed. Terminal 130 is at 0 volts for the binary 1 condition, held at 0 volts by the clamping action of current flow through 131' and 97. Current flow through the circuit 177, 179 holds transistor 90 non-conductive. Current flow through the circuit 99, 104 holds transistor 91 non-conductive. Current flow through the circuit 175, 176 holds transistor 94 non-conductive. Point X is slightly above ground potential. A negative-going "on" pulse is applied, via capacitor 174, to emitter 103, and, via resistor 173, to emitter 192. Transistor 91 will conduct. Transistor 94 remains cut off. Point X will drop to −10 volts. Transistor 90 conducts. Transistor 94 is still held non-conductive by current flow in the circuit 175, 176. The output voltage at 130 drops to −10 volts, the binary 0 condition, and is clamped at −10 volts by the clamping action of diode 114.

In order to turn the PNPN structure off, point X is raised slightly above ground potential, by application of a negative pulse, via "off" terminal 162 and capacitor 172, to base 190. This pulse renders transistor 94 conductive, and the collector of that transistor (i.e., point X) is raised slightly above 0 volts, turning off the PNPN structure so that the output voltage at 130 returns to 0 volts, the binary 1 condition.

In a binary counter stage it is necesssary to produce a carry when the stage transfers from the binary 1 condition to the binary 0 condition. Since a negative edge is here employed to trigger the bistable element, the binary 1 output state is chosen at the 0 volt level, and the binary 0 state is at a −10 volt output level. In order to reset a binary counter made up of bistable trigger elements, it is necessary to force all outputs to the binary 0 state or −10 volt output level. That is to say, with respect to the Fig. 3 bistable trigger unit, it is necessary to render the PNPN structure conductive. This can be accomplished by forcing point X down to the −10 volt level to reset the unit. For this purpose, there is provided a reset pulse input 180 and a diode 178 in circuit between 180 and point X. The operation of this diode, it being poled with its cathode adjacent terminal 180, is such that a reset pulse of −10 volts amplitude forces point X down to −10 volts to reset the unit.

A pulse changing the counter's status (such as that of 20, Fig. 2) from 0 to 1 introduces a positive-going edge at its output terminal 130 (Fig. 3) which has no effect on the next counter (such as 21, Fig. 2). However, if the status (as at 130, Fig. 3) is changed from binary 1 (0 volts) to binary 0 (−10 volts), a negative pulse is introduced to the next counter, and this pulse changes the status of the next counter. In other words, whenever the PNPN structure changes from a non-conducting to a conducting condition, a negative output pulse is sent to the next cascaded counter.

When separate "on" and "off" inputs are applied to terminals 163 and 162, respectively (Fig. 3), no pulse routing circuits are required. However, when the Fig. 3 unit is used as a binary counter, there is only a single input (as would be the case if terminals 162 and 163 were connected or combined). In such case, pulse steering circuitry is required The pulse steering circuitry of Fig. 3 comprises an "off" pulse input terminal 162 and an "on" pulse input terminal 163 (which may be assumed to be connected). Such pulses are negative-going square pulses descending from 0 volts to −10 volts. The "off" pulse is routed to the base of transistor 94, via capacitor 172, to turn off the PNPN structure. The "on" pulse is routed to the emitter of transistor 91, via capacitor 174, to turn on the PNPN structure. The circuitry is so arranged that the condition at output terminal 130 controls the routing of input pulses in such a way that an "on" pulse is routed through capacitor 174 when the PNPN structure is off (0 volts at terminal 130), and pulses are prevented from reaching capacitor 172. On the other hand, an "off" pulse is routed through capacitor 172 when the PNPN structure is on (−10 volts at terminal 130) and pulses are then prevented from reaching capacitor 174.

For this purpose, controlled diodes 165 and 170 are placed in series with input terminals 163 and 162, respectively, each with its cathode poled toward the corresponding input terminal. The anode of diode 165 is placed at 0 volts when the PNPN structure is off, so that the diode will pass an input "on" pulse of −10 volts amplitude. The anode of diode 165 is placed at −10 volts when the PNPN structure is on, so that the diode 165 will not pass a pulse of such small amplitude. This is accomplished by clamping the anode of diode 165 to the output level at terminal 130 by a negative clamping diode 166, having its cathode connected to terminal 130. This clamping diode prevents the anode of diode 165 from going above 0 volts when the PNPN structure is off, and above −10 volts when the structure is on. When the PNPN structure is on, electron flow through diode 166 is in this circuit: terminal 130, 166, resistor 173 (connected between terminal 127 and the junction of diodes 166, 165) and terminal 127.

The anode of controlled diode 170 is connected by resistor 171 to terminal 115 (−10 volts). The cathode of diode 170 is placed at 0 volts when the PNPN structure is off, so that the diode 170 will not pass a pulse of only −10 volts amplitude. The cathode of diode 170 is placed at −10 volts when the PNPN structure is conducting, so that the diode 170 will then pass an "off" pulse. This is accomplished by clamping the cathode of diode 170 substantially to the output level of terminal 130 by a negative clamping diode 167, the cathode of which is connected to the junction of terminal 130 and diode 166. In series between diode 167 and ground 201 are resistors 168 and 169. Blocking capacitor 164 is inserted between "off" input 162 and the junction of these two resistors. Clamping diode 167 prevents the cathode of diode 170 from going above 0 volts when the PNPN structure is off, and above −10 volts when the PNPN structure is on. When the PNPN structure is on electron flow through diode 167 is in this circuit: terminal 130, 167, resistors 168 and 169 and ground.

In the bistable trigger element embodiment herein shown, the performance characteristics and illustrative parameters are as follows:

| | |
|---|---|
| Diode 178 | Type 1N90. |
| Diode 104 | Type S320G. |
| Diode 112 | Type S320G. |
| Diode 97 | Type 1N281. |
| Diode 179 | Type S320G. |
| Diode 114 | Type 1N281. |
| Diode 176 | Type S320G. |
| Diode 170 | Type 1N90. |
| Diode 166 | Type 1N281. |
| Diode 167 | Type 1N90. |
| Diode 165 | Type 1N281. |
| Resistor 99 | 4700 ohms. |
| Resistor 131 | 4700 ohms. |
| Resistor 102 | 330 ohms. |
| Resistor 177 | 68,000 ohms. |
| Resistor 175 | 22,000 ohms. |
| Resistor 173 | 4700 ohms. |
| Resistor 171 | 2200 ohms. |
| Resistor 169 | 22,000 ohms. |
| Resistor 168 | 680 ohms. |
| Capacitor 174 | 150 micromicrofarads. |
| Capacitor 172 | 0.005 microfarad. |
| Capacitor 164 | 270 micromicrofarads. |
| Transistor 90 | GE Type 2N135. |
| Transistor 91 | GE Type 2N78. |
| Transistor 94 | GE Type 2N135. |
| Output voltage | Clamped, 0 or −10 volts. |
| Output current (D.C.) | 30 milliamperes maximum at 25° C. |
| Output current (pulse) | 50 milliamperes maximum (into capacitor load). |
| Output impedance (D.C.) | Less than 10 ohms up to 30 milliamperes load. |
| Output impedance (pulse) | Approximately 100 ohms. |
| Input | −5 to −10 volt pulse or step, with a minimum rate of 25 volts per microsecond. |
| Input impedance (pulse) | Approximately 2000 ohms. |
| Switching time | 0.15 microsecond or less. |
| Maximum delay between input and output | 0.1 microsecond. |
| Power dissipation | 350 milliwatts at −10 volt output, 100 milliwatts at 0 volt output. |
| Power supply | +15 volts, 8 milliamperes; +1 volt, 2 milliamperes; −10 volts, 5 milliamperes; −12.5 volts, 7 milliamperes; −15 volts, 6 milliamperes; −25 volts, 2 milliamperes. |
| Temperature range | −50 to +85° C. Above 25° some derating of load current and switching speed is necessary. |
| Size | 2½ inches x 2 inches x ½ inch over-all. |

*The inverter amplifier*

In Fig. 7 there is shown an inverter amplifier or complementer in accordance with the invention. This circuit performs the logical "Not" operation and furnishes an output pulse which is the inverse of the input. In other words, it provides an output which is the "ones complement" of the input—i.e., changes ones to zeros and zeros to ones. Referring to the equations in Fig. 1, it will be seen that outputs $BT_1$, $BT_2$ and $BT_3$ are required. The complementers or "not" circuits "N" furnish a one output for a binary zero input.

The Fig. 7 inverter amplifier comprises a common emitter stage in combination with a PNPN structure. The common-emitter connected PNP transistor 120 is so arranged that its emitter-base junction is conducting when the input voltage level is −10 volts, and non-conducting when the input voltage level is 0 volts. Accordingly, a series resistor 121 is connected between the input terminal 162 and base 123 of transistor 120, and the base is connected through resistor 124 to a voltage supply terminal 125 (+15 volts). The resistors 121 and 124 are so proportioned that the positive bias applied to the base of transistor 120 assures cut-off of that transistor when the input voltage level is 0, but permits the base to go a few volts negative relative to emitter 126 when the input is at −10 volts. The emitter is connected to supply voltage terminal 127 (+1 volt). The collector is clamped to −10 volts, during the "on" condition of the PNPN structure, by the positive clamping circuit comprising diode 114, the cathode of which is connected to the junction of collector 128 and the base 92 of transistor 90, and the anode of which is connected to supply voltage terminal 115 (−10 volts). This circuit clamps the base of the wave form at the base 92 of transistor 90 (point X) to −10 volts, and it also clamps the wave form at output terminal 130 to −10 volts when transistor 90 is conducting. That is, diode 114 prevents point X from going more negative than −10 volts during the binary zero output condition at 130. It will be seen that the base-emitter junction 123, 126 is non-conducting when the input voltage level at 162 is zero (binary 1 condition) and conducting when the input voltage level is −10 volts (binary 0 condition).

The junction transistors 90 (PNP) and 91 (NPN) are shown in Fig. 7. The base 92 of PNP transistor 90 is connected to the collector 93 of NPN transistor 91. Similarly, the base 98 of transistor 91 is connected to the collector 95 of transistor 90. Both transistors 90 and 91 are cut off only when the input to base 92 is held close to 0 volts—i.e., when a −10 volts negative or binary 0 pulse is applied to terminal 162 (1 output condition at terminal 130, 0 condition at terminal 162). Both transistors 90 and 91 are conducting when the input to base 92 is approximately at −10 volts (binary 0 output condition at terminal 130, 1 input condition at terminal 122). The transistor 120 effects a phase reversal—i.e., inverts the pulse applied to terminal 162, bringing the base 92 slightly above 0 volts (when a square wave descending from 0 to −10 volts is applied to the input terminal 162). When the voltage level at terminal 162 is at 0 volts, the voltage at base 92 approximates −10 volts.

A negative clamping diode 97 is connected between the emitter 96 and ground, with its cathode on the ground side, to clamp the output voltage peak to ground level (0 volts) when the output terminal 130 is in the binary 1 state. Load resistor 131 is connected between emitter 96 and terminal 125 of a voltage source (+15 volts) to supply positive biasing potential for emitter 96. In order to provide negative bias for the transistor 91 (i.e., reverse emitter base bias), to hold that transistor in its non-conducting state, the base 98 is connected, through resistor 99, to a terminal 100 which is more negative in potential (−25 volts) than the terminal 101 (−15 volts), to which, through resistor 102, emitter 103 is connected.

A diode 104 is connected between base 98 and terminal 101, and poled with its cathode adjacent base 98, so that current flow through the diode in the circuit 101, 104, 99, 100 produces a small bias to hold transistor 91 cut off, the voltage drop across the diode biasing the emitter 103 positive (in a reverse direction) relative to the base.

Saturation of collector currents in each transistor is prevented by providing a fixed reverse-bias across each collector-to-base junction. This is accomplished by a circuit comprising terminal 110 (connected to a supply voltage, at −12.5 volts), a negative clamping diode 112 (the anode of which is connected at point Z to the base 98 and collector 95), the two base-collector junctions, positive clamping diode 114 (the cathode of which is connected to the base 92 and collector 93), and terminal 115 at −10 volts). Tracing this circuit from 115 to 110 and bearing in mind that terminal 110 is 2.5 volts negative relative to terminal 115, this circuit produces a small reverse bias across each base-collector junction, to prevent saturation.

That is to say, positive clamping circuit 114 clamps the base of the waveform at point X to −10 volts when the PNPN structure is conducting. Negative clamping circuit 112 clamps the peak of the voltage wave form at point Z to −12.5 volts when the PNPN structure is conducting. The collector 128 is connected to point X and point X is connected through resistor 136 to terminal 100 (−25 volts). Collector load resistor 136 accelerates the drop of point X to −10 volts when a binary 1 input is applied at 162.

For the conductive condition of the PNPN structure, point X (that is, the junction of collector 128 and base 92) is clamped at −10 volts by positive clamping diode 114. This diode also functions to clamp the output terminal 130 at −10 volts for the conductive condition of the PNPN structure, because under that circumstance the emitter-base junction 92, 96 is conducting. That is, the output voltage at terminal 130 cannot go more negative than −10 volts when the PNPN structure is conducting.

The operation of the circuit of Fig. 7 is now described. Let us assume that the PNPN structure is non-conducting (1 condition at output terminal 130). The input at terminal 162 is at −10 volts (zero condition). The base 123 of transistor 120 is negative compared to its emitter voltage. Transistor 120 is conducting and its collector 128 and the base 92 of transistor 90 are held close to zero volts (actually at about +1 volt). Transistor 90 is held cut off. The emitter 103 of transistor 91 is held more positive than base 98 by the drop across diode 104, and transistor 91 is also cut off. The output is 0 volts at terminal 130 (1 state) and is clamped in that condition by diode 97.

When the voltage level at input terminal 162 is at zero volts (for a 1 input condition), the base 123 of the common emitter stage transistor 120 becomes more positive than the emitter 126 and the transistor 120 is cut off, so that point X, the base of transistor 90, now goes negative. Diode 114 prevents point X from becoming more negative than −10 volts. Transistor 90 conducts, its emitter being positive relative to its base. The voltage at point Z (collector 95 and base 98) rises until it becomes equal to −12.5 volts. This rise is caused by collector current of transistor 90 flowing in resistor 99. This point Z, base of transistor 91, is now positive relative to emitter 103. Transistor 91 is therefore conducting, and the current through it is determined by the value of emitter load resistor 102.

Transistor 90 conducting, the voltage at output terminal 130 can be no more negative than the voltage at point X (base 92). The output is therefore held at −10 volts (for a 0 output condition).

The input circuit to the common emitter stage comprises a parallel combination of resistor 121 and capacitor 135. The capacitor 135 increases the turn-on speed of transistor 120 when the input pulse at terminal 122 goes negative (from 0 to −10 volts). That is, the transistor is overdriven when the input goes negative. When the input goes to ground potential, at the end of an input pulse, the recovery time of the transistor is decreased.

When a steady state voltage is applied to terminal 162, resistance 121 determines the base current of common emitter transistor 120. To provide an adequate safety margin, resistors 121 and 124 are so chosen that when the input voltage to base 123 falls from 0 to −5 volts, the base of transistor 120 just begins to be more negative than the emitter. An input voltage (at terminal 162) more negative than −5 volts will therefore give an output (at terminal 130) of 0 volts. The value of resistor 121 is such as to provide enough base current to force point X up close to +1 volt and yet not allow transistor 120 to saturate.

The over-all operation of the inverter amplifier unit shown in Fig. 7 is such that in response to a negative going input pulse of square shape, descending from zero to −10 volts, indicative of a binary 0 input, there is produced at output terminal 130 a pulse of opposite polarity ascending from −10 to zero volts, indicative of a 1 output.

The following illustrative parameters have been found suitable in one embodiment of the inverter amplifier in accordance with the invention:

| | |
|---|---|
| Diode 114 | Type 1N281 |
| Diode 112 | Type S320G |
| Diode 104 | Type S320G |
| Diode 97 | Type 1N281 |
| Resistor 121 | ohms 3900 |
| Resistor 124 | do 12,000 |
| Resistor 136 | do 1500 |
| Resistor 102 | do 330 |
| Resistor 99 | do 4700 |
| Resistor 131 | do 2200 |
| Capacitor 135 | micromicrofarads 270 |
| Transistor 120 | GE Type 2N135 |
| Transistor 91 | GE Type 2N78 |
| Transistor 90 | GE Type 2N135 |

*The gated amplifier*

Reference is made to Fig. 6 for a showing of the gated amplifier in accordance with the invention. This building block or unit (such as 40, Fig. 2) performs the logical "And" operation, with amplification, in that it comprises a double input coincidence gate in combination with an emitter follower stage and the clamped PNPN structure which is generic to the several active building blocks provided in accordance with the invention. From the description already given, the construction and operation of the PNPN structure and associated clamping circuits will be understood. This circuit (Fig. 6) is so arranged that when both input terminals 163 and 162 are at the 0 volts level, the emitter follower transistor 151 is in a state of high conductivity, and point X is at approximately 0 volts. We have seen from the previous description of the PNPN structure that its output at terminal 130 is at 0 volts, indicative of a binary 1 state, when point X is at approximately 0 volts and when the PNPN structure is non-conducting or off. We have also seen that when point X is at —10 volts, the output of the PNPN structure at terminal 130 is also at —10 volts and the PNPN structure is in its high-conductive state for a binary 0 condition output.

The input pulses are applied to the base of the NPN transistor 151, connected as a common collector or emitter follower amplifier stage. To provide a two-input coincidence gate, diodes 147 and 148 are connected between such base and input terminals 163 and 162, respectively, such diodes being poled with their cathodes near the input terminals and being associated with load resistor 149, connected to terminal 125 (at +15 volts) in such a way that pulses in the region between ground potential or 0 volts and —10 volts are passed. The collector 153 of transistor 151 is connected to terminal 127 (at +1 volt), and its emitter 154 is connected to point X—i.e., base of transistor 90 and collector of transistor 91.

The junction transistors 90 (PNP) and 91 (NPN) are again shown in Fig. 6. The base 92 of PNP transistor 90 is connected to the collector 93 of NPN transistor 91. Similarly, the base 98 of transistor 91 is connected to the collector 95 of transistor 90. Both transistors 90 and 91 are cut off only when the input to base 92 is held close to 0 volts—that is, if the inputs to both input terminals 163 and 162 rise to 0 volts (a binary 1 output condition at terminal 130). Both transistors 90 and 91 are conducting when the input to base 92 is approximately at —10 volts (binary 0 output condition at terminal 130, binary 0 input condition at at least one of terminals 163 and 162). The transistor 151 does not effect a phase reversal, and its emitter voltage follows its base voltage.

The negative clamping diode 97 is connected between the emitter 96 and ground, with its cathode on the ground side to clamp the output voltage peak to ground level (0 volts) when the output terminal 130 is in the binary 1 state. Load resistor 131 is connected between emitter 96 and terminal 125 of the voltage source (+15 volts) to supply positive bias potential for emitter 96. In order to provide negative bias for the transistor 91 (i.e., reverse emitter-base bias) to hold that transistor in its non-conductive state, the base 98 is connected, through resistor 99, to a terminal 100, which is more negative in potential (—25 volts) than the terminal 101 (—15 volts), to which, through resistor 102, emitter 103 is connected.

A diode 104 is connected between base 98 and terminal 101, and poled with its cathode adjacent base 98, so that current flow through the diode in the circuit 101, 104, 99, 100 produces a small bias to hold transistor 91 cut off, the voltage drop across the diode biasing the emitter 103 positive (in a reverse direction) relative to the base.

Saturation of collector currents in each transistor is prevented by providing a fixed reverse-bias across each collector-to-base junction. This is accomplished by a circuit comprising terminal 110 (connected to a supply voltage, at —12.5 volts), a negative clamping diode 112 (the anode of which is connected at point Z to the base 98 and collector 95), the two base-collector junctions, positive clamping diode 114 (the cathode of which is connected to the base 92 and collector 93), and terminal 115 (at —10 volts). Tracing this circuit from 115 to 110 and bearing in mind that terminal 110 is 2.5 volts negative relative to terminal 115, this circuit produces a small reverse bias across each base-collector junction, to prevent saturation.

That is to say, positive clamping circuit 114 clamps the base of the waveform at point X to —10 volts when the PNPN structure is conducting. Negative clamping circuit 112 clamps the peak of the voltage wave form at point Z to —12.5 volts when the PNPN structure is conducting.

For the conductive condition of the PNPN structure, point X (that is, the junction of collector 93 and base 92) is clamped at —10 volts by positive clamping diode 114. This diode also functions to clamp the output terminal 130 at —10 volts for the conductive condition of the PNPN structure, because under that circumstance the emitter-base junction 92, 96 is conducting. That is, the output voltage at terminal 130 cannot go more negative than —10 volts when the PNPN structure is conducting.

The operation of the circuit of Fig. 6 is now described. Diodes 147 and 148 along with resistors 149 form a double-input "And" gate having an output feeding the base of the emitter follower transistor 151. If the inputs at 163 and 162 are both at —10 volts, corresponding to a 0 state, the base of transistor 151 will be held at —10 volts, and point X will also be close to —10 volts, giving an output at terminal 130 of —10 volts, indicative of a 0 state, the PNPN structure then being conductive. If one input at terminals 163 and 162 rises above —10 volts, no change occurs in the potential at the base 152 of transistor 151, and therefore no change occurs at output terminal 130. If, however, both inputs at 163 and 162 rise from —10 to 0 volts, the base 152 of transistor 151 will be raised to 0 volts, the emitter of transistor 151 will be raised to 0 volts, and accordingly point X is raised to 0 volts, cutting off transistor 90 and in turn transistor 91, so that the output voltage at terminal 130 is raised to 0 volts, indicative of a binary 1 state. This condition exists as long as both input terminals 163 and 162 remain at 0 volts. If one of the input terminals 163 and 162 goes to —10 volts, the negative going edge will be transferred through capacitor 150 to the emitter of transistor 91, rendering the PNPN structure conductive. That is to say, the PNPN structure is rendered conductive by reason of the negative transition of either one of inputs 163 and 162, the pulse being applied to emitter 103 via capacitor 150. In one embodiment of the invention, the following circuit parameters were employed:

| | |
|---|---|
| Diode 147 | Type 1N90 |
| Diode 148 | Type 1N90 |
| Diode 114 | Type 1N281 |
| Diode 112 | Type S320G |
| Diode 104 | Type S320G |
| Diode 97 | Type 1N281 |
| Resistor 149 | ohms 6800 |
| Resistor 102 | do 330 |
| Resistor 99 | do 4700 |
| Resistor 131 | do 2200 |
| Capacitor 150 | micromicrofarads 68 |
| Transistor 151 | GE Type 2N78 |
| Transistor 91 | GE Type 2N78 |
| Transistor 90 | GE Type 2N135 |

*The monostable element*

In Fig. 5 there is shown a circuit of a monostable element or building block in accordance with the invention. It comprises the PNPN structure and associated clamping circuits, in combination with suitable reactance controlling the duration of the output pulse. This building block is a one-shot pulse generator. In its quiescent condition, the output voltage at terminal 130 is 0. When a negative pulse or step is applied to the input, a negative output pulse of fixed width is generated. Such output pulse has an amplitude of —10 volts. This building block may, for example, be driven by any of the outputs $e_1$, $e_2$, or $e_3$ in Fig. 2. It is of utility in providing a source of trigger pulses for a bistable unit. It may be driven by a clock pulse generator or variable frequency pulse generator, or manually by a push-button switch. It has a low output impedance.

The PNPN structure comprising transistors 90 and 91 is again shown in Fig. 5, together with the associated diodes 114, 104, 112 and 97. The source of trigger signals is coupled to the emitter of transistor 91 by a capacitor 161. It has already been shown that a negative-going pulse (0 volts to −10 volts) at this point triggers the PNPN structure into its high-current or conductive state. The resultant output pulse is terminated by reason of the action of time-constant or reactive circuitry. Accordingly, there is arranged, between terminal 127 (+1 volt) and point X (base 92) a series circuit comprising inductance 156, resistance 159, and diode 155 (poled with cathode adjacent point X). In shunt with the inductance is a series combination of damping diode 157 and resistor 158, the diode being poled with its cathode adjacent terminal 127.

When the PNPN structure is "off," current through resistor 131 and negative clamping diode 97 clamps the output voltage at output terminal 130 to ground level. The emitter of transistor 91 is biased positively relative to its base by reason of the connection of the emitter 103, through resistor 102, to −15 volt terminal 101 and the connection of the base, through resistor 99, to −25 volt terminal 100. Diode 114 prevents point X from going more negative than −10 volts when the PNPN structure is conducting. Diode 112 prevents point Z (collector of transistor 90) from going more positive than −12.5 volts when the PNPN structure is conducting. The structure is prevented from saturating by reason of the net reverse bias, which is always at least 2.5 volts, across each collector-base junction. During the "off" condition of the PNPN structure, point X is close to 0 volts and point Z is close to −16 volts, so that diodes 114 and 112 do not then actively function.

A diode 104 is connected between base 98 and terminal 101, and poled with its cathode adjacent base 98, so that current flow through the diode in the circuit 101, 104, 99, 100 produces a small bias to hold transistor 91 cut off, the voltage drop across the diode biasing the emitter positive relative to the base.

For the conductive condition of the PNPN structure, point X (that is, the junction of collector 93 and base 92) is clamped at −10 volts by positive clamping diode 114. This diode also functions to clamp the output terminal 130 at −10 volts for the conductive condition of the PNPN structure, because under that circumstance the emitter-base junction 92, 96 is conducting. That is, the output voltage at terminal 130 cannot go more negative than −10 volts when the PNPN structure is conducting.

When a negative-going pulse is applied, via capacitor 161, transistor 91 conducts and point X goes negative to −10 volts, so that transistor 90 conducts. Point X being negative, current flows from terminal 127, through inductor 156, resistor 159 and diode 155. When such current reaches a steady state value, the magnetic field in the inductive system collapses, rendering highly positive the potential at the junction of resistor 159 and inductor 156. The damping diode 157 damps out any oscillations after the first positive swing. The width of the output pulse (a square-wave pulse −10 volts amplitude) is determined by the resonant frequency of inductance 156 and the stray circuit capacity. Point X according rises slightly above the 0 volts level, and the PNPN structure is cut off, terminating the output pulse. The diode 157 isolates the inductance 156 from the PNPN structure and reduces the effect of the capacity of that structure on the resonant frequency of 156.

In the monostable element embodiment herein shown, the performance characteristics and illustrative parameters are as follows:

| | |
|---|---|
| Inductor 156 | 350 microhenries. |
| Diode 157 | Type 1N90. |
| Diode 114 | Type 1N281. |
| Diode 155 | Type 1N90. |
| Diode 112 | Type S320G. |
| Diode 97 | Type 1N281. |
| Diode 104 | Type S320G. |
| Resistor 158 | 1000 ohms. |
| Resistor 159 | 470 ohms. |
| Resistor 102 | 330 ohms. |
| Resistor 99 | 4700 ohms. |
| Resistor 131 | 2200 ohms. |
| Capacitor 161 | 150 micromicrofarads. |
| Transistor 90 | GE Type 2N135. |
| Transistor 91 | GE Type 2N78. |
| Output Current | 50 milliamperes maximum. |
| Output Pulse Width | Nominally 0.5 microsecond. |
| Output Pulse Rise Time | 0.15 microsecond or less. |
| Input Trigger | A pulse or step, −5 to −10 volts with a minimum rate of 25 volts per microsecond. |
| Repetition Rate | Up to 1 megacycle. |
| Power Dissipation | Quiescent condition, 75 milliwatts. |
| Temperature Limitation | −50° to 85° C., with some derating of load current and switching speed above 25° C. |
| Size (of unit constructed in a manner similar to Fig. 4) | 2½ inches x 2 inches x ½ inch over-all. |

*Mechanical structure*

Figure 10:
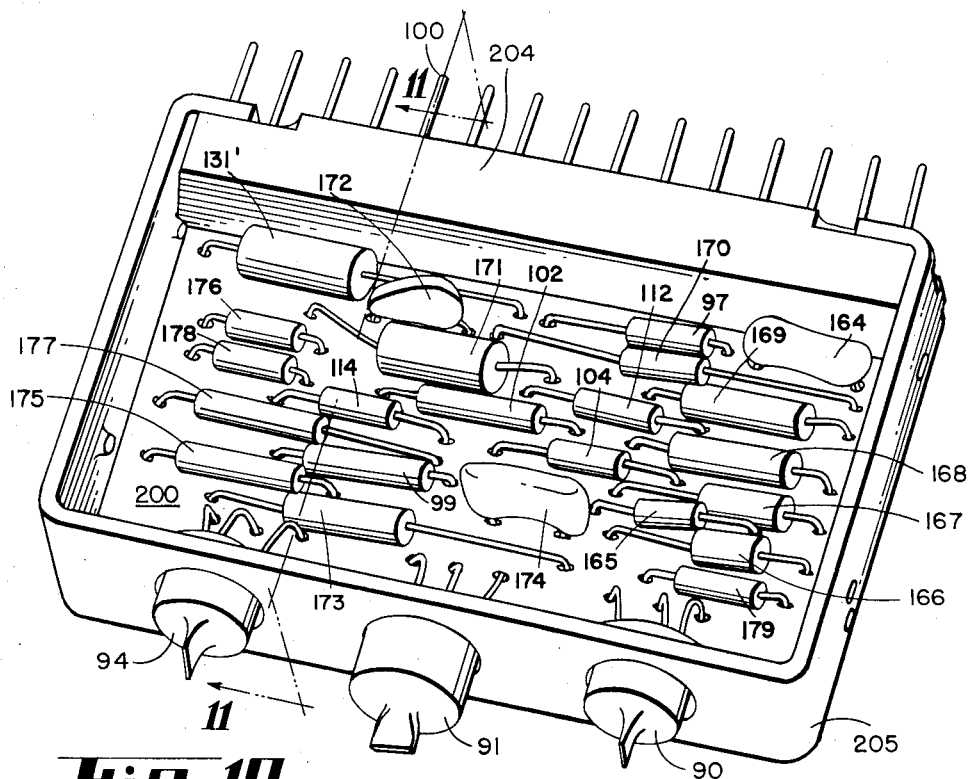
Fig. 10 is a perspective view of the preferred physical embodiment of bistable trigger element in accordance with the invention.
Figure 11:
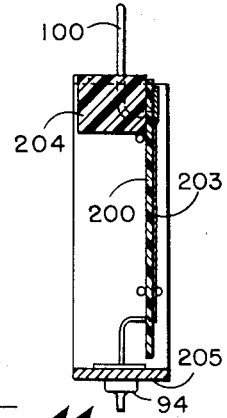
Fig. 11 is a sectional view of such bistable trigger unit as taken along the section line 11—11 of Fig. 10 and looking in the direction of the arows.

Referring now to Figs. 4, 10, and 11, there is shown the mechanical or physical structure of the Fig. 3 bistable trigger unit or logical building block in accordance with the invention. This building block structure is typical, and the same general techniques of miniaturiziation and printed circuitry are employed in the other building blocks. Since the bistable element structure is representative, the other structures are not shown in mechanical detail. The Fig. 4 showing of the bistable trigger element is a plan view showing the top of the trigger unit. The circuit elements are designated by the same reference numerals as they have in Fig. 3, hereinabove described, and further description of such elements is deemed unnecessary. They are designated by block outlines in Fig. 4 and shown graphically in Figs. 10 and 11. All circuit elements are carried by a printed circuit board 200 of rectangular configuration, and the printed circuitry is deposited or otherwise placed on the bottom of board 200, as indicated by the dashed outlines in Fig. 4. The printed circuitry is indicated generally by the reference numeral 203 in Fig. 11. The output connections are illustrated in Fig. 4 and given the same reference numerals as in Fig. 3. The terminal 100 (supply terminal for −25 volts), for example, comprises a pin which projects through a plastic block 204 and contacts the printed circuitry in the proper position, all as illustrated in Figs. 4 and 11. The board 200 is secured to a U-shaped metallic member 205, which is suitably apertured to provide a mounting for transistors 90, 91, and 94 and appropriately formed rigidly to secure in place the terminal block 204.

The mechanical construction of each of the logical building blocks is similar. The terminal positions for all of the active blocks are identical.

It is important to note that the following terminals (Fig. 4) are used wherever needed, in all of the active packaged units, for these purposes:

| | |
|---|---|
| 125 | +15 volts supply. |
| 127 | +1 volt supply. |
| 115 | −10 volts supply. |
| 100 | −25 volts supply. |
| 101 | −15 volts supply. |
| 110 | −12.5 volts supply. |
| 180 | Reset. |
| 130 | Output of active unit. |
| 201 | Ground connection. |

The input terminals of the active units are also arranged in standardized positions.

These terminals are standardized as to position, and this factor contributes greatly to the flexibility and mechanical compatibility of the various active elements. The term "active" is herein employed as inclusive of all the logical building blocks shown other than the "And" and "Or" circuits.

Since all of the active units use identical PNPN circuitry and clamping circuits, and since the supply voltages are standardized, and since the positions of the terminals are identical in the various active units, and since the active units are structurally arranged in similar fashion, and since voltage levels are fixed, the system of units possesses unique advantages of mechanical and electrical compatibility. The "And" and "Or" elements are also packaged. By the use of these units a digital system is easily built up by merely plugging the packaged units into rack mountings which contain appropriate sockets and connections, the units being plugged into such sockets. Such connections are as dictated by the peculiar requirements of the individual installation desired.

While there has been shown and described what is at present considered to be the preferred embodiment of the present invention, it will be obvious to those skilled in the art that various modifications and changes may be made without departing from the true scope of the invention, and it is, accordingly, intended in the appended claim to cover all such changes and modifications.

What is claimed is:

A digital system comprising a plurality of active transistorized compatible plug-in units, each unit comprising a mounting and, secured to said mounting, logical operator means comprising: the combination of: a first PNP type transistor having a base and emitter and collector, an NPN type transistor having a base and emitter and collector, the emitter of the first PNP transistor being the output, a first structure terminal interconnecting the collector of the NPN transistor and the base of the first PNP transistor, a second structure terminal interconnecting the collector of the first PNP transistor and the base of the NPN transistor, said transistors and interconnections being equivalent to a two-state PNPN structure, a positive clamping diode for clamping the first terminal to a first reference potential level of minus ten volts when the structure is in its high-current binary "0" state, a first reference potential terminal connected to the anode of said clamping diode, a first negative clamping diode connected between said output and a second reference potential level of zero volts for clamping the output to said second reference potential level when the structure is in its "off" or binary "1" state, individual load resistors connected to the emitters of said first PNP type transistor and said NPN transistor, a first positive voltage terminal coupled to said first structure terminal to bias it slightly above said second reference potential level, a second positive voltage terminal of plus fifteen volts connected to the emitter resistor of said first PNP type transistor and a first negative voltage terminal of minus fifteen volts connected to the emitter resistor of said NPN transistor, the voltage of said negative voltage terminal being more negative than said first reference potential level, and the voltage of the second positive voltage terminal being more positive than said first positive voltage terminal and said second reference potential level, a second negative voltage terminal of minus twelve and one half volts, a second negative clamping diode connected between said second structure terminal and said second negative voltage terminal, the voltage of said second negative voltage terminal being more negative than said first reference potential level and less negative than said first negative voltage terminal, said second negative clamping diode clamping the second structure terminal to a voltage more negative than the first structure terminal to provide a reverse bias on each base-collector junction, a fourth diode connected between said second structure terminal and the emitter circuit of said NPN transistor with its cathode connected to the base of said transistor, a third negative voltage terminal of minus twenty five volts having a voltage more negative than any of the other negative voltage terminals or reference potentials, and a first resistance connected between the third negative voltage terminal and said second structure terminal, said voltage terminals and output terminal and first reference potential terminal being positioned with standardized spacing and sequence to render the units mechanically and electrically compatible.

References Cited in the file of this patent

UNITED STATES PATENTS

| | | |
|---|---|---|
| 2,629,834 | Trent | Feb. 24, 1953 |
| 2,670,445 | Felher | Feb. 23, 1954 |
| 2,676,271 | Baldwin | Apr. 20, 1954 |
| 2,712,065 | Elbourn et al. | June 28, 1955 |
| 2,874,313 | Githens | Feb. 17, 1959 |
| 2,890,353 | Van Overbeek et al. | June 9, 1959 |

OTHER REFERENCES

Chaplin: "The Transistor Regenerative Amplifier as a Computer Element, October 1954. Proceedings of the Institution of Elect. Eng., vol. 101, No. 73, Part III, pages 298–307.

Computer Development (SEAC and DYSEAC) NBS Circular 551, National Bureau of Standards, Washington, D.C. (Jan. 25, 1955), pps. 54 to 57.

Brooks: Symbolic logic, binary calculation, and 3C-PACS, published by Computer Control Co. Inc., 93 Broad St., Wellesley 57, Mass. (1955).

Turk et al.: Publication, Basic Circuitry of Midac and Midsoc, May 1954, published by Engineering Research Institute, Ann Arbor, Michigan, pages 1–5 to 1–20, II–I, IV–I to IV–3.

UNITED STATES PATENT OFFICE
CERTIFICATION OF CORRECTION

Patent No. 2,976,428                  March 21, 1961

Douglas F. Parkhill et al.

It is hereby certified that error appears in the above numbered patent requiring correction and that the said Letters Patent should read as corrected below.

Column 1, line 66, for "Alos" read -- Also --; column 2, line 50, for "arows" read -- arrows --; column 3, line 10, after "$(C_4+C_6)$" insert -- . Z --; column 14, line 31, for "$BT_1$, $BT_2$ and $BT_3$" read -- $\overline{BT}_1$, $\overline{BT}_2$ and $\overline{BT}_3$ --; column 19, line 23, for "to" read -- at --; line 67, after "pulse" insert -- of --; line 69, for "according" read -- accordingly --.

Signed and sealed this 19th day of September 1961.

(SEAL)
Attest:

ERNEST W. SWIDER
Attesting Officer

DAVID L. LADD
Commissioner of Patents